C. T. RIDGELY.
DEMOUNTABLE WHEEL.
APPLICATION FILED MAR. 8, 1918.

1,365,343.

Patented Jan. 11, 1921.
2 SHEETS—SHEET 1.

INVENTOR
Charles T. Ridgely,
By his attorneys.
McDermott & McCready

C. T. RIDGELY.
DEMOUNTABLE WHEEL.
APPLICATION FILED MAR. 8, 1918.

1,365,343.

Patented Jan. 11, 1921.
2 SHEETS—SHEET 2.

INVENTOR
Charles T. Ridgely
By his attorneys
McDermott & McCready

UNITED STATES PATENT OFFICE.

CHARLES T. RIDGELY, OF BOSTON, MASSACHUSETTS.

DEMOUNTABLE WHEEL.

1,365,343.  Specification of Letters Patent.  Patented Jan. 11, 1921.

Application filed March 8, 1918. Serial No. 221,276.

*To all whom it may concern:*

Be it known that I, CHARLES T. RIDGELY, a citizen of the United States, residing at Boston, in the county of Suffolk and State of Massachusetts, have invented certain Improvements in Demountable Wheels, of which the following description, in connection with the accompanying drawings, is a specification, like reference characters on the drawings indicating like parts in the several figures.

This invention relates to demountable wheels for motor vehicles and the like, and it has for its general objects to effect an economy in the merchandising of wheels of this character, to facilitate the equipment of motor vehicles with such wheels, and to provide improved securing means for wheels of this character.

In equipping motor vehicles with demountable wheels of the constructions now on the market it is necessary to provide not only the wheel parts but also a complete new set of hubs, the regular hubs including those equipped with ball-bearings being discarded. The expense of these new hubs obviously is a very important item in the cost of equipping a car with demountable wheels, and it is one of the objects of the present invention to devise means for eliminating this additional expense; or, in other words, to devise a construction with which demountable wheels can be fitted to the regular commercial hubs.

In using demountable wheels much difficulty has been experienced with the wheel securing means, usually a nut, that is employed to clamp the wheel on the hub since the vibration and the starting and stopping of the car tend to back off the nut and free the wheel. An important feature of the present invention resides in the provision of a locking means for the wheel which is not only reliable but also can be economically manufactured.

These and other features of the invention, including a construction by means of which the equipment of a car with demountable wheels is greatly facilitated, will be readily understood from the following description, reference being made to the accompanying drawings in which.

Figure 1:
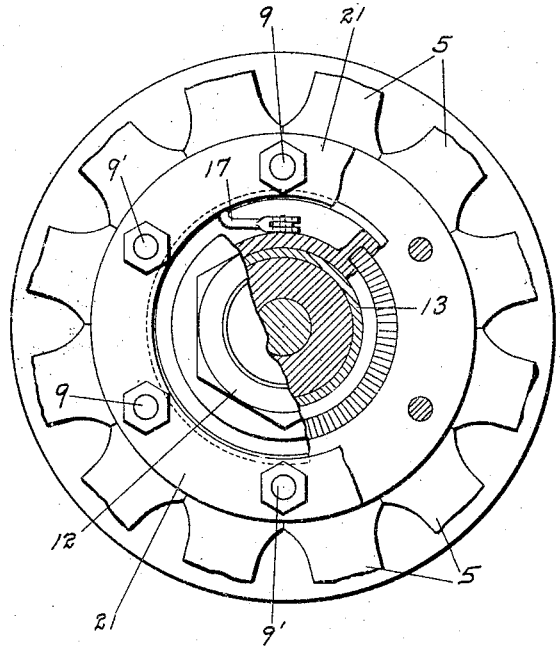
Figure 1 is a front view, partly in cross section, of a part of a demountable wheel constructed in accordance with this invention, showing this wheel applied to the rear hub of a vehicle.
Figure 2:
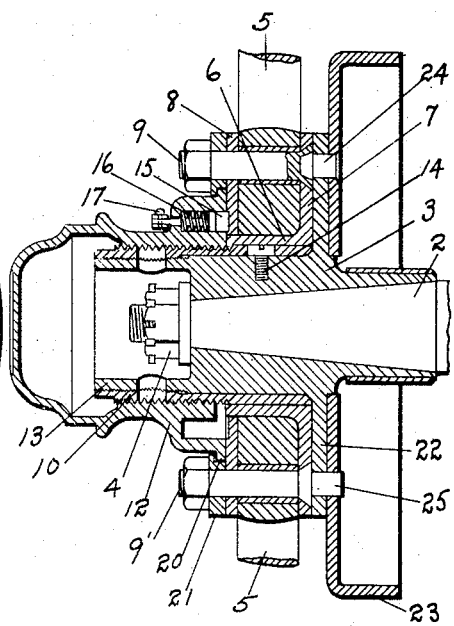
Fig. 2 is a longitudinal cross sectional view of the construction shown in Fig. 1.

Referring now particularly to Figs. 1 and 2, the construction there shown comprises the tapered end 2 of a rear axle and a hub 3 secured on the part 2 by a nut 4. A wheel is supported on this hub 3 and comprises a series of spokes 5 having their inner ends mounted in a supplemental hub. This latter hub consists of a cylindrical part 6 concentric with the hub 3 and provided with a disk-like flange or plate 7 to bear against the rear faces of the spokes, and also includes a front plate 8 adapted to slide upon the cylindrical part 6 and extending parallel to the rear plate or flange 7. A series of bolts 9 and 9' extending through the supplemental hub clamp the spokes securely between the plates 7 and 8.

In order to compensate for different shapes and sizes of hubs and thus avoid the necessity for a special main hub, an adapter sleeve 10 is provided between the main hub 3 and the supplemental hub. This sleeve has an interior surface shaped to fit the peripheral surface of the main hub 3 and an exterior surface shaped to fit the interior of the supplemental hub and threaded to receive a nut 12 by means of which the supplemental hub is secured on the main hub. The hub 3 shown in Fig. 2 is in very common use and is the form used on Ford cars. The extreme end portion 13 of this hub is threaded externally to receive the hub cap and the sleeve 10 has a part threaded to engage the portion 13 and another part shaped to extend over the inner portion of the hub. A set screw 14 threaded into the hub 3 and having its head lying flush with the periphery of the sleeve 10 prevents any possibility of this sleeve becoming disengaged. In fact, when this sleeve is once installed it becomes practically a permanent part of the hub and is never removed from it.

Figure 3:
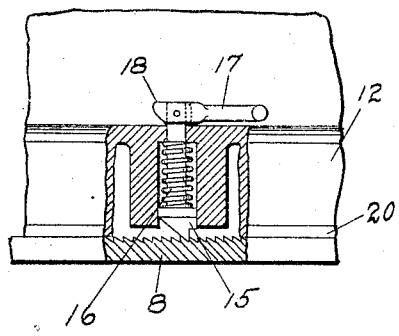
Fig. 3 is a cross sectional view, partly in elevation, of a locking device.

The hub cap and nut 12 are made integral so that any necessity for a separate cap is avoided. In order to lock the nut against backward movement the front face plate 8 is toothed as best shown in Fig. 3, and the nut is provided with a pawl 15 designed to engage these teeth. This pawl, as clearly shown in Figs. 2 and 3, is mounted in a hole drilled in the nut in a direction substantially parallel to its axis, the shank of the pawl being encircled by a spring 16 which bears at one end against the head of the pawl and at its opposite end against the base of the hole so that it tends to hold the pawl in engagement with the teeth on the plate 8. In order to disengage the pawl whenever it is desired to remove the nut, the shank of the pawl is extended through the wall of the nut and is pivotally connected to a lever or handle 17 that normally lies against the face of the enlarged base of the nut. A cam surface 18, Fig. 3, is formed on the lever 17 adjacent to its point of connection with the pawl shank and is so shaped that when the lever is turned into its upright position so that it extends substantially parallel to the shank the contact of this cam face with the part of the nut adjacent to the shank raises the pawl clear of the teeth on the plate 8. This frees the nut and allows it to be unscrewed. At other times the engagement of the pawl with the teeth positively locks the nut against backward or unscrewing movement.

It sometimes happens that the supplemental hub will become rusted on the main hub and can be loosened only with considerable difficulty. For the purpose of facilitating the removal of the wheel under these circumstances the nut may be rotatably secured to the supplemental hub. A construction of this character is shown in Figs. 1 and 2, the enlarged end of the nut being provided with a narrow flange or bead 20 which is received in a correspondingly shaped recess formed in an annular plate 21 that is clamped to the front face of the plate 8 by means of the bolts 9 and 9'. The advantage of this construction is that the unscrewing of the nut 12 will back off the supplemental hub and avoid the necessity for pounding or prying this hub away from the main hub.

The hub 3 has a flange 22 projecting radially from its rear end and in the usual or nondemountable constructions the spokes are secured between this flange and another flange by means of several bolts, usually six. The brake drum 23 is also secured to this flange 22 so that all of these running elements are normally secured together for rotation in unison. When the hub is equipped with a demountable wheel it is also necessary to have certain of these elements, particularly the hub and the brake drum, secured for rotation in unison and it is also necessary to provide a driving connection between the wheel and these elements. In order to provide such a connection conventionally and to require a minimum amount of work on the part of the car owner who undertakes to equip his car with a set of demountable wheels, fastenings are employed by means of which this driving connection may be conventionally provided and still permit the supplemental hub to be freely disengaged whenever it is necessary to remove the wheel. In the construction shown the main hub flange 22 and the brake drum 23 are secured together with three rivets, one of which is indicated at 24, Fig. 2. Each of these rivets has a short tapering head that projects in front of the face of the flange 22. Each of the bolts 9 is provided on the end adjacent to the brake drum with a head that is recessed to receive the head of one of the rivets 24. The other three bolts 9' which alternate with the bolts 9 are of the construction shown clearly in Fig. 2; that is, each has a short stud 25 projecting from the front of its tapered head. These studs enter holes that register with each other and are formed in the flange 22 and drum 23. When the supplemental hub is removed the bolts 9 and 9' readily disengage, respectively, from the studs 24 and the holes in the flange 22 and drum 23. This arrangement makes it unnecessary for a car owner to drill extra holes either in the hub flange or the brake drum and requires him to perform merely a very simple riveting operation in order to secure the two running elements 3 and 23 together in their required relationship for the reception of the demountable wheel.

Figure 5:
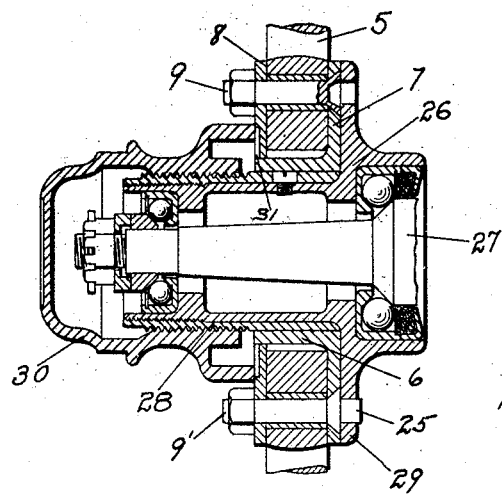
Fig. 5 is a longitudinal cross sectional view of a demountable wheel applied to the front hub.
Figure 6:
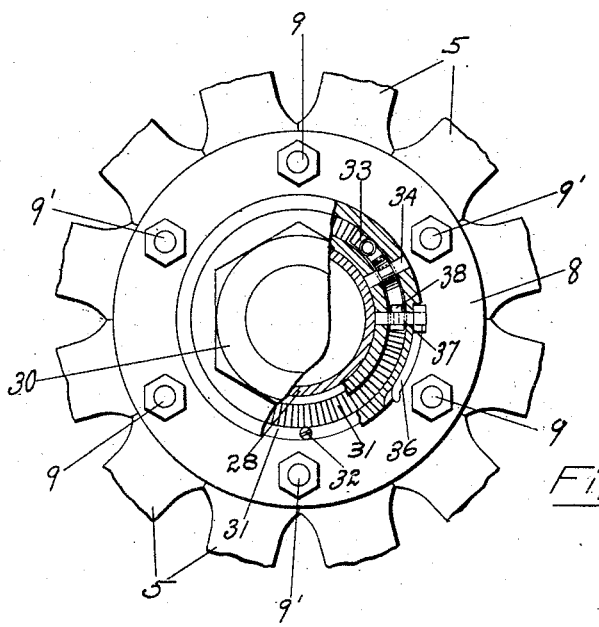
Fig. 6 is a front elevation, partly in cross section, of the construction shown in Fig. 5.

Figs. 5 and 6 show substantially the same wheel construction as that shown in Figs. 1 and 2 applied to the front wheel of a motor vehicle. In this construction the main hub 26, the shaft 27 and the ball-bearings and parts that secure them in place are of the regular stock construction. A sleeve 28 of the same general construction as the sleeve 10, previously described, is employed to fit the hub 26 for the reception of the supplemental hub. The latter hub and the wheel carried by it are adapted for use on either front or rear. The studs 25 projecting from the bolts 9' enter holes in the flange 29 of the hub 26 but there is no driving engagement between the bolts 9 and the hub. Since the front wheel turns freely on the axle it is not necessary to have as substantial a driving connection between the front wheel and the main hub as between the rear wheel and the main hub.

Figure 4:
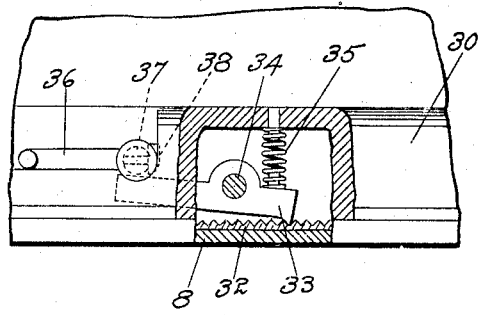
Fig. 4 is a view similar to Fig. 3, of another form of locking device.

In this arrangement the nut 30, which corresponds to the nut 12 of the construction above described, is equipped with a slightly different form of locking device and the ratchet teeth, instead of being formed directly on the front face of the plate 8, are made on a separate plate, for instance by stamping them in a thin steel plate and then hardening the plate. This plate is shown in the drawings at 31 and it is secured to the plate 8 by several screws, one of which is indicated at 32. The locking device is best shown in Fig. 4 and comprises a pawl 33 pivoted in an annular recess cored out of the nut 30. A coiled spring 35 acts on one end of this pawl to hold it normally in engagement with the teeth of the plate 32. For the purpose of releasing this pawl when desired a lever or handle 36 mounted fast on a pin 37 that projects through the base of the nut 30 is arranged to be moved from the position in which it is shown in Fig. 1 to an upright position where it projects parallel to the axis of the nut. During this movement it swings a cam block 38 fast on the pin 37 into engagement with the tail piece of the pawl 33 and raises the opposite end of the pawl against the tension on the spring 35 out of engagement with the ratchet teeth.

It will now be understood that this invention materially reduces the expense of equipping a car with demountable wheels since by using sleeves, such as those shown at 10 and 28, but of shapes and dimensions suited to the particular car to be fitted, the same supplemental hubs and nuts may be used for a great variety of cars, consequently the expense formerly incurred by the necessity of throwing away the regular hubs and ball-bearings and purchasing new hubs and ball-bearings to take their place is avoided. This arrangement also reduces the labor required, as above explained, in fitting hubs and brake drums to take the demountable wheels. Furthermore, the locking devices shown, while economical to manufacture and very simple in construction, are absolutely reliable, are not likely to become disturbed or unlocked accidentally and will wear for a long time without deteriorating materially.

An advantage of recessing the enlarged base of the nuts 12 and 30 is that the annular recess or groove can be filled with hard grease or graphite and this material forms a packing that prevents the entrance of water into the interior parts. The making of the nut and hub cap in a single piece is also of advantage for this same reason and for the further reason that it reduces manufacturing expense and avoids any possibility of the hub cap becoming detached and lost. A tighter fit between the end of the nut and the face plate 8 also is obtained by recessing the nut since this recessing operation gives to the base of the nut a slight resiliency that allows the nut to have the very slight yielding action necessary to enable it to conform to the face of the plate 8. It will also be noted that the peculiar mounting of the sleeves 10 and 28 permits the removal of these sleeves whenever desired, as for instance, when it becomes necessary to remove the hub 3. In performing this removing operation it is merely necessary to take out the screw 14 and utilize the hole formerly occupied by the head of this screw to receive the tip of a spanner wrench by means of which the sleeve may be unthreaded from the hub. A wheel puller can then be threaded on to the hub in the usual manner. This sleeve not only acts as an adapter in the sense of compensating for variations in dimensions, but it permits the use of a nut having a very much coarser thread than that with which the regular hubs are provided and which is far more serviceable in a construction of this character than a fine thread would be.

While I have herein shown and described the best embodiment of the invention, of which I am at present aware, it will be understood that this embodiment may be variously modified within the skill of the mechanic and the discretion of the designer without departing from the spirit or scope of the invention.

What is claimed as new, is:

1. In a vehicle, the combination of a plurality of running elements, rivets securing said elements together, a supplemental hub, spokes mounted in said hub, and fastenings clamping said spokes in said hub, said fastenings having recesses to receive the projecting heads of said rivets whereby the engagement of said rivets with said fastenings forms a driving connection between said elements and said hub.

2. In a vehicle, the combination of a wheel having supplemental hub members and recessed fastenings securing the spokes of the wheel to said hub members, a running element, means for demountably securing said wheel to said running element, and projections rotating with said running element and arranged to enter the recesses in said fastenings to form a driving connection between said element and said wheel.

3. In a vehicle, the combination of a main hub, a brake drum, a plurality of rivets securing said hub and brake drum together and having projecting heads, a wheel having a supplemental hub mounted on said main hub, means for demountably securing said supplemental hub on said main hub, and bolts extending through said supplemental hub and provided with recesses to receive the projecting heads of said rivets, whereby the engagement of the rivets with said bolts forms a driving connection between said main hub and said supplemental hub.

In testimony whereof I have signed my name to this specification.

CHARLES T. RIDGELY.